Aug. 23, 1927.

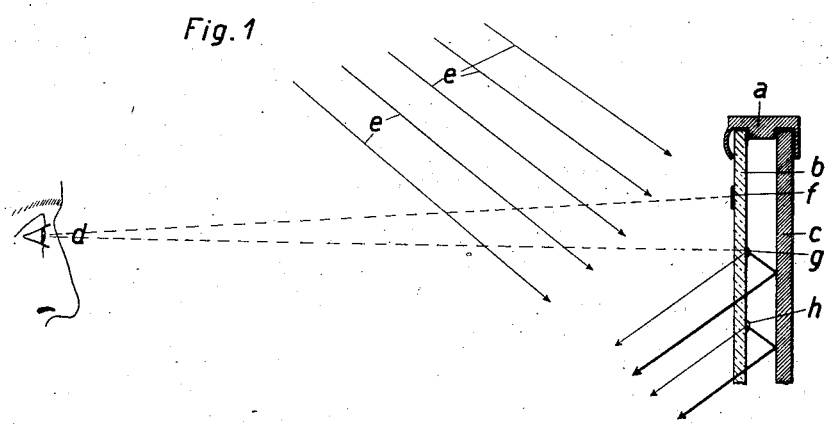
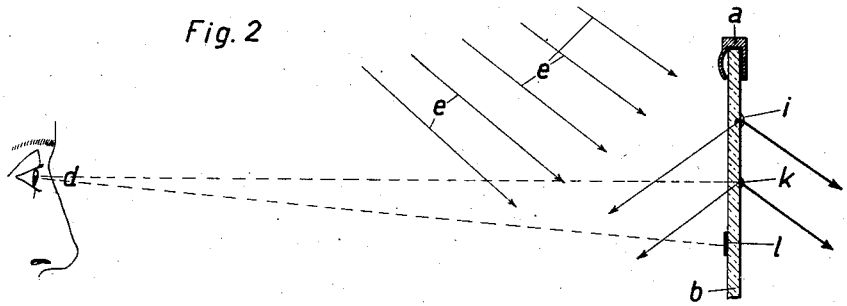
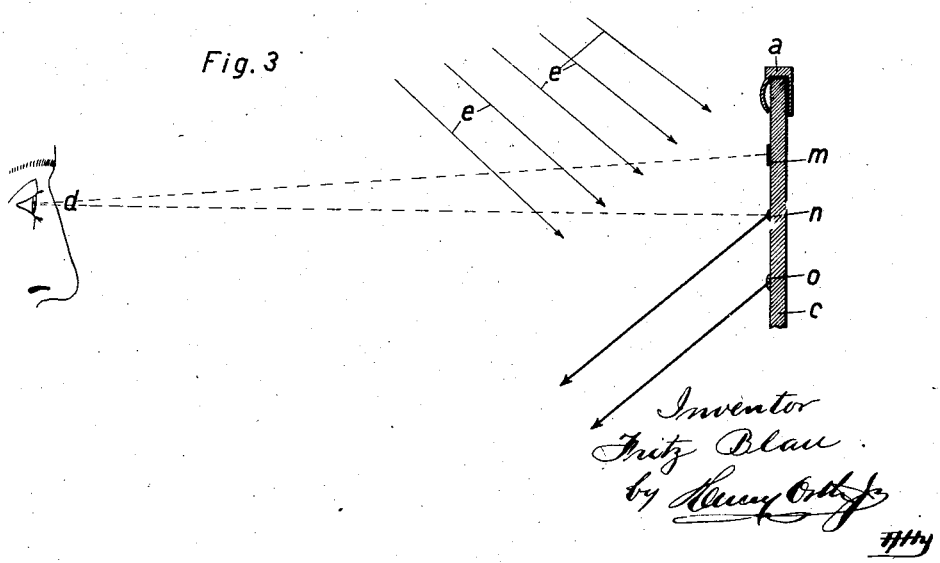

F. BLAU 1,640,230

PAINTING AND PROCESS FOR THE PRODUCTION OF THE SAME

Filed July 11, 1923    2 Sheets-Sheet 2

Inventor
Fritz Blau
by Henry Orth
Atty

Patented Aug. 23, 1927.

1,640,230

UNITED STATES PATENT OFFICE.

FRITZ BLAU, OF BERLIN, GERMANY.

PAINTING AND PROCESS FOR THE PRODUCTION OF THE SAME.

Application filed July 11, 1923, Serial No. 650,820, and in Germany July 12, 1922.

It is of common knowledge that the effect of the pigments which are used in painting and in related arts and industries for the production of paintings, of reproductions, drawings and the like, is due exclusively to the fact that these pigments diffusedly reflect the light which falls upon them.

The greatest reflecting capability of all pigments which may be practically used is considerably less than 100%, the brightest white reflecting aproximately 80% of the incident light and the brightest coloured pigments reflecting even less. The darkest black pigments reflect approximately 4% of the incident light. (It may happen in exceptional cases that the percentage is slightly smaller). From this results that the extreme differences produced between dark and light on a painting which is homogeneously illuminated are in a relation approximately 4 to 80 or 1 to 20. In nature one finds however greater differences of brightness. The brightness of the brightest points compared with that of the darkest points perceived by the eye simultaneously or almost simultaneously, is sometimes a million times greater.

The following question may be raised:—

Does the art of painting and the arts and industries related to the same require the production of greater relative differences of brightness than those which could hitherto be realized by means of the pigments at disposal?

It is evidently very improbable that the painters and other artists should not be desirous to be able to render the relative differences of brightness of coloured and uncoloured objects in a better manner than it is possible with the aid of the pigments which are at disposal at present. It is however probable that the painter, knowing that no other pigments are at his disposal, has never troubled himself about the pictorial possibilities of which he might profit if other pigments were at his disposal than those at his actual disposal.

The above question may therefore well be answered by " yes."

One might further ask if it is possible to produce greater differences of brightness (thinking of course only of objects illuminated by a homogeneous light).

This invention relates to a process, and to special forms of execution of the same, designed to produce these greater differences of brightness, and to new types of paintings or pictures in which, with a homogeneous illumination, these increased differences of brightness are produced.

It seemed hopeless to attempt to substitute for the lightest colours which are at present at disposal still lighter colours as the greatest brightness is already approximately 80% of the possible. In this direction only an improvement of 20% could be obtained.

On the contrary it will be possible to realize extremly greater proportions between the lightest and darkest points of a painting in starting from the socalled ideal black body of physics or from similar bodies.

An ideal black body or a body which does not reflect any light can be produced in making in the non-transparent envelope of a large hollow chamber a comparatively small opening. The person who views this opening from the outside sees the same absolutely black (without taking into account an exception which has however nothing to do with the present case). A black pigment placed near the opening on the outer surface of the envelope appears therefore, in accordance with the intensity of the illumination coming from the outside, lighter in any desired degree, wherefrom follows that a painting can be produced which shows, between the darkest points and the lightest points, differences of brightness which may be increased at will, provided that these darkest points are represented by openings in the envelope of a hollow chamber which, in comparison with the opening, is very large and the chamber is limited by opaque walls.

If such a hollow chamber, which on the inner surface is preferably painted black, is made of very large size and if in the envelope of the hollow chamber an opening of one square meter is made, which size of the opening may be still very small in proportion to the size of the hollow body, and if this opening is covered with two rows of extraordinarily thin black wires standing perpendicularly to one another the wires being for instance $\frac{1}{100}$ mm. thick and arranged at distances of 1 mm. apart from one another, a wire screen being thus formed the meshes of which are 1 square mm., only $\frac{2}{100}$ of that quantity of light which falls on the above mentioned square meter, will be reflected as would otherwise be reflected from a surface of 1 square meter uniformly coated with black pigment. From the inside of the hollow body, especially when the illumination is conveniently regulated and does not reflect into the eye of the observer the light which falls into the hollow chamber, no light will come out. The surface of all the black wires amounts together only to $\frac{2}{100}$ of a square meter. If the wires surfaces, for instance support a white pigment applied so as to connect two or more of open squares and cover the same, the proportion of the brightness of these surfaces to the brightness of a not painted surface of the same size is 1000 to 1 and not 20 to 1 which was the utmost which could be obtained with the present manner of painting.

If all the proportions of brightness between 1 and 20 are called one "octave" much more than two octaves are at disposal in the present case.

This space into which the observer looks through the trellis work need evidently not be a closed dark space. It will be sufficient, if it is relatively very dark in comparison with the light falling on the paintings. A strongly illuminated painting of this kind, hung up in the open air, will for instance show up especially well at night.

There exists however other means to come very near to the body physically black, but in this case the illumination must be directed.

If a transparent pane of glass is placed in front of the opening of the hollow chamber, it will look absolutely dark if viewed in a direction which does not coincide with the direction of the reflected rays coming from a bundle of light rays directed upon the glass pane. If on the glass pane a painting is made with coloured pigments which reflect the light in a diffused manner and if with the aid of a bundle of almost parallelly directed light rays, for instance by means of a projector, the glass pane is illuminted with such an intensity that a white zone possesses a brightness which is equal to 1000 by any unit of measurement, a zone painted with a black pigment will possesss $\frac{1}{20}$ of this brightness or a brightness equal to 50. A zone which is covered with dots or thin lines of black pigment applied at approximately uniform distances on the surface proportion of 1 to 10, will possess, if viewed from any direction except from the direction of the reflected rays, a brightness of approximately 5, and a zone not covered at all will possess a quite feeble brightness which could not be considered to be zero as it is not possible to establish an ideal glass pane, viz, a glass pane the reflection of which is absolutely free from diffusion.

Instead of applying the pigments only partly, very thin and therefore very transparent layers may be applied.

It offers no difficulty at all to produce proportion of brightness of 1000 to 1 and more.

For the large hollow chamber behind the transparent glass pane a mirror may be substituted with the same result.

This mirror may be a metal mirror or glass pane or a reflecting dark plate, made for instance of opaque black glass, or even of wood painted black and perfectly polished, or it may consist of any surfaces whatsoever coated with a glazing varnish. The first mentioned mirror of metal, wood or the like may be directly painted upon. In this case also (with the condition that the directly reflected light of the direct illumination be not deflected into the eye of the observer), the amplified differences of brightness as described may also be easily obtained in an important manner compared with the differences obtained at present.

As an example of a form of execution of the invention a painting may be described which is painted on a black mirror of opaque black glass. The light is thrown on this painting, for instance by means of a search light, whilst the observer may be placed at any point, but not in the direct direction of the reflected rays, which direction is determined by the plane of the picture and by the position of the source of light.

The intensity of the illumination produced by the search light will be selected so that the zones which are almost the darkest of the painting, but for which differences of darkness in comparison with the darkest zone must be still perceived, appear lighter than the latter.

The darkest zones to be represented are not coated with pigments, so that they are almost absolutely black. The zones which must not appear quite so dark but which, in comparison with the brightest zones, must appear darker than the brightest zones can be obtained with the aid of pigments, which have reflecting values that are in the proportion of 1 to 20, are represented as mentioned above by a partial coating (application of dark pigment lines or tiny darkly coloured dots).

If for instance a square centimeter of the painting has to possess a brightness equal to $\frac{1}{200}$ of the brightness of the lightest white point, the square centimeter in question will be covered with dark lines or dots uniformly distributed in the proportion of 1 to 10 $\left(\frac{1}{20} \times \frac{1}{10} = \frac{1}{200}\right)$. (In this calculation the minimum diffusely-reflecting capability of the black mirror is treated as a negligible quantity).

As each particle of dust on the black part of the painting reflects the light in a diffused manner, care has to be taken to protect such paintings against dust. If with this object in view the painting is covered with a glass plate, the surface of this glass plate must be kept free from dust.

The pigment may be applied on that side of the transparent plate which is turned away from the observer, said transparent plate standing in front of the opening of a black hollow chamber or of a mirror which is on the other side of the observer, but care has to be taken that the layers of paint are not applied on the glass plate in such an uniformly dense and flat manner that the capability of diffused reflection is lost. In this case it is easy to connect the glass plate dust-tightly with the hollow chamber or mirror. The black hollow chamber or the separate mirror might be dispensed with, if the parts on the side turned away from the observer which are not covered by pigment are covered with varnish or other analogous dark substances applied with sufficient denseness and smoothness, so that a mirror effect is produced at these points.

The invention may be illustrated by the following:

Figure 1 is a vertical section illustrating the effect produced with opaque and translucent paint and no paint on the pigment support, in conjunction with a dark or black reflector back of the painting.

Fig. 2 is a like view illustrating the effect in that portion of a picture having a dark space behind the transparent pigment support.

Fig. 3 illustrates that portion of a picture where some of the color is applied to the dark mirror.

Figure 4:
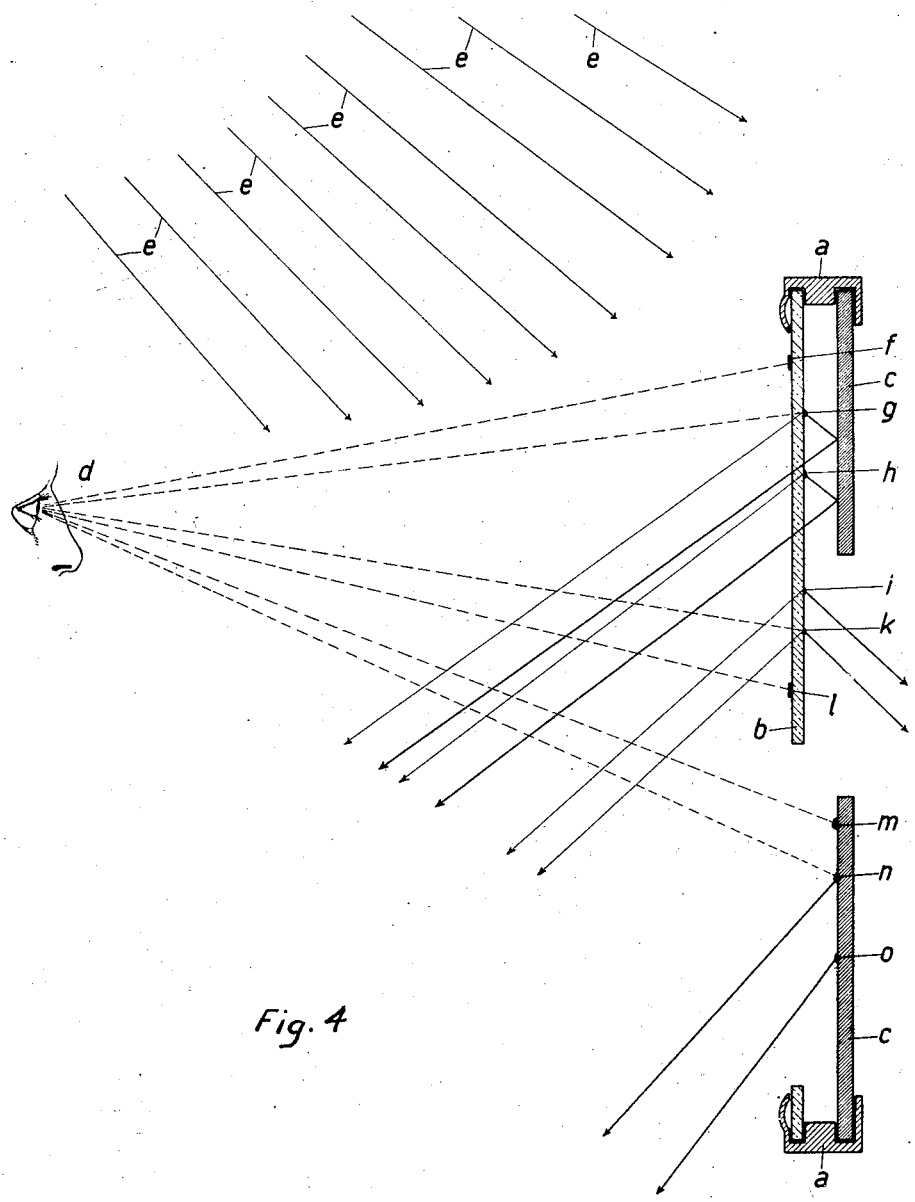
Fig. 4 illustrates a picture made in accordance with this invention.

In the drawings the picture frame is inindicated by $a$ in which is mounted at the front a transparent sheet of glass having a reflecting surface extending only partly over the area of the frame.

Behind the glass plate $b$ is an opaque mirror $c$ also extending over a part of the area of the frame with the glass plate $a$ extending over only a portion of the area not occupied by the opaque reflector $c$.

The position of the observer is indicated at $d$ and the direction of illumination is shown at $e$.

$f, g, h, i, k, l, m, n, o$, are points in the picture that may be on the front or rear surface of the transparent sheet of glass $b$ or on the surface of the reflector $c$ according to the composition depicted.

On a face of the glass, $f$ and $l$ represent portions of the picture in thick layer of pigment impervious to light or only slightly translucent, while $m$ represents a similar pigment layer on the opaque reflector $c$.

In this instance $f$ and $l$ are shown on the front face of the glass $b$, but they may be on the rear face. These places $f$ and $l$ reflect all light that passes therefrom to the eye of the observer as diffused light, which is indicated by dotted lines.

The parts $g$ and $k$ on the transparent reflecting glass plate $b$ and the one $n$ on the face of the opaque reflector indicate thin, transparent pigment layers, the one $g$ passes most of the light through the glass and reflects it from the surface of the opaque reflector $c$ out of the path of vision, as indicated by the heavy line, from behind this point. Some light will also be reflected from the path of vision by the rear face of the glass plate $b$ as indicated by light lines, and a small portion as diffused light reaches the observer, as indicated by dotted lines at this point.

At $k$ a small part of the light is reflected from the glass plate $b$ away from the observer, a small part reaches the observer as diffused light, while the greater part passes into the dark background through the opening or portion of the frame area not covered by the opaque reflector $c$.

At $n$ the greater part of the light is reflected from the opaque reflector out of the path of vision, and only a very small part as diffused light to the observer.

The parts of the picture at $h$, $i$ and $o$ are free of pigment. All light at the point $h$ is reflected from the path of vision, partly by the glass plate $b$ but mainly the light passing through the glass by the opaque reflector $c$ so that no light passes to the observer at $d$.

From $o$ the light is entirely reflected from the pigment free portion of the opaque reflector, and no diffused light reaches the eye.

It is indifferent whether the parts coated with pigment are on the front side or on the back of the glass plate, provided they do not reflect like a mirror, and it is indifferent whether the front side of the painting opposite to the observer be coated with varnish or not.

It is scarcely necessary to mention that, in all forms of execution of this invention, care has to be taken that the surfaces painted with pigments turned towards the observer reflect in a manner as diffuse as possible, or be as dull as possible.

It is evident that, independently of the directed light which serves for illuminating the painting, another light in the room will influence the differences of brightness. This action is however small if the directed light is comparatively very intensive and it may besides be reduced to the minimum, on the one hand by convenient selection of the distribution of the total illumination of the room, and on the other hand by the utilization of dark hangings and the like.

Without discussing the question to know how far the creating artist will use the novel means, this invention permits numerous applications in connection with pictures for commercial purposes, for instance advertisements and the like.

Those parts of the pictures which, with a convenient illumination and with convenient position of the observer, appear, owing to an effect of transparency (with dark back ground, or owing to a mirror effect or for both these reasons, a great many times darker than any other part of the picture which may be made as dark as possible by the application of pigment, will be preferably called "over-dark parts."

The word "painting" may be interpreted as comprising any representation which has several or a great number of degrees of brightness on the surface, this "painting" produced in whatever manner and by means of differently or uniformly coloured pigments.

I claim:—

1. A painting for directed illumination, comprising between light and over-dark portions a contrast greater than that between the diffused reflections of white and black.

2. A painting for directed illumination, comprising over-dark portions formed by openings in the painted surface suitably darkened at the back.

3. A painting for directed illumination, comprising over-dark portions formed by an opening in the painted surface and a pigment support covering said opening and showing black where not covered by pigment.

4. A painting for directed illumination, which when so illumined has between the brightest and darkest parts, as compared with the difference between the lightest and darkest pigments, a difference in illumination contrast several times greater than can be produced by said pigments, and whose dark portions are represented by portions practically incapable of diffused reflection.

5. A painting for directed illumination, which when so illumined has between its brightest and darkest portions as compared with the difference between the lightest and darkest pigments, a difference in illumination contrast several times greater than can be produced by said pigments and in which the dark portions are formed by a dark mirror.

6. A painting for directed illumination, which when so illumined has between its brightest and darkest portions as compared with the difference between the lightest and darkest pigments, a difference in illumination contrast several times greater than can be produced by said pigments and in which the dark portions are formed by a dark mirror and in front of which is arranged a transparent pigment carrying pane.

7. A painting for directed illumination, which when so illumined has between its brightest and darkest portions as compared with the difference between the lightest and darkest pigments, a difference in illumination contrast several times greater than can can be produced by said pigments, and in which the dark portions are formed by a dark mirror and in front of which is arranged a transparent pigment carrying pane with pigments on the surface opposite to that viewed by the observer.

8. A painting for directed illumination, which when so illumined has between its brightest and darkest portions as compared with the difference between the lightest and darkest pigments, a difference in illumination contrast several times greater than can be produced by said pigments, and in which the dark portions are formed by a dark mirror and in front of which is arranged a transparent pigment carrying pane with pigment on both sides of said pane.

9. A painting for directed illumination, which when so illumined has between its brightest and darkest portions as compared with the difference between the lightest and darkest pigments, a difference in illumination contrast several times greater than can be produced by said pigments, and in which dark portions are produced by a dark reflector, and other dark portions are modified by incomplete pigment layers.

10. A painting for directed illumination, which when so illumined has between its brightest and darkest portions as compared with the difference between the lightest and darkest pigments, a difference in illumination contrast several times greater than can be produced by said pigments, and in which dark portions are produced by a dark reflector and other dark portions are modified by incomplete pigment layers and a transparent pane on which the layers are painted.

In testimony whereof I affix my signature.

FRITZ BLAU.